United States Patent
Kyriacou

(10) Patent No.: US 11,747,071 B2
(45) Date of Patent: Sep. 5, 2023

(54) SYSTEMS AND METHODS FOR DETECTING AND MONITORING ICE FORMATION WITHIN AN ICE MAKER

(71) Applicant: Haier US Appliance Solutions, Inc., Wilmington, DE (US)

(72) Inventor: Stephanos Kyriacou, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 64 days.

(21) Appl. No.: 17/496,232

(22) Filed: Oct. 7, 2021

(65) Prior Publication Data

US 2023/0112274 A1    Apr. 13, 2023

(51) Int. Cl.
| | | |
|---|---|---|
| *F25C 5/187* | (2018.01) | |
| *F25C 5/20* | (2018.01) | |
| *G06T 7/00* | (2017.01) | |

(52) U.S. Cl.
CPC ............... *F25C 5/187* (2013.01); *F25C 5/22* (2018.01); *G06T 7/0002* (2013.01); *F25C 2400/10* (2013.01); *F25C 2700/02* (2013.01)

(58) Field of Classification Search
CPC ........ F25C 5/187; F25C 5/22; F25C 2400/10; F25C 2700/02; F25C 1/24; G06T 7/0002
See application file for complete search history.

(56) References Cited

U.S. PATENT DOCUMENTS

| | | |
|---|---|---|
| 6,282,909 B1 | 9/2001 | Newman |
| 6,581,393 B2 | 6/2003 | Newman |
| 7,185,508 B2 | 3/2007 | Voglewede |
| 7,849,699 B2 | 12/2010 | Allen |
| 8,156,748 B2 | 4/2012 | Ashrafzadeh |
| 9,989,295 B2 | 6/2018 | Chase |
| 10,126,034 B2 | 11/2018 | Cronin |
| 10,563,898 B2 | 2/2020 | Park |
| 10,877,728 B2 | 12/2020 | Jeon |
| 2008/0092567 A1 | 4/2008 | Doberstein |
| 2015/0241106 A1* | 8/2015 | Chase ............. F25C 5/187 62/135 |
| 2017/0138655 A1* | 5/2017 | Cronin ............ F25C 1/20 |
| 2020/0323246 A1 | 10/2020 | Jacobs |
| 2020/0333034 A1* | 10/2020 | Hwang ............ F24F 11/58 |

FOREIGN PATENT DOCUMENTS

| | | | |
|---|---|---|---|
| JP | H0534043 | | 2/1993 |
| JP | H10253213 A | | 9/1998 |
| JP | 2974176 | | 11/1999 |
| JP | 2974177 | | 11/1999 |
| JP | 2002048439 A | * | 2/2002 |
| JP | 2002048439 A | | 2/2002 |
| KR | 20200082193 | | 7/2020 |
| WO | WO2020129242 | | 6/2020 |
| WO | WO2020230879 | | 11/2020 |

OTHER PUBLICATIONS

Translation JP-2002048439-A.*

* cited by examiner

*Primary Examiner* — Elizabeth J Martin
(74) *Attorney, Agent, or Firm* — Dority & Manning, P.A.

(57) ABSTRACT

A method of detecting ice within an automatic ice maker includes capturing an image of an ice mold within the ice maker, analyzing the image using a machine learning image recognition process, determining one or more characteristics of the ice maker, and implementing a responsive action to control the ice maker accordingly.

18 Claims, 5 Drawing Sheets

SYSTEMS AND METHODS FOR DETECTING AND MONITORING ICE FORMATION WITHIN AN ICE MAKER

FIELD OF THE INVENTION

The present subject matter relates generally to refrigerator appliances, and more particularly to automatic ice makers provided within refrigerator appliances.

BACKGROUND OF THE INVENTION

Household refrigerator appliances often include automatic ice makers or ice maker assemblies therein. These automatic ice makers typically rely on algorithms to routinely monitor a supply of liquid water to an ice mold, monitor the temperature of the ice mold, regulate a harvest of the ice cubes once the water is frozen into ice, and monitor a resupply of liquid water to the ice mold to repeat the process. Certain sensors and detection methods are incorporated to determine when the ice is frozen, a level of ice within a storage bucket, whether a jam or blockage is present, and the like. Moreover, many newer refrigerator appliances are incorporating modular ice makers which may swap out multiple different styles, sizes, or types of ice makers or ice trays or molds within the ice maker.

However, certain problems exist with the current implementations. For starters, multiple sensors or other means for detecting ice levels, ice temperatures, or the like are required to be provided within the ice maker. Each sensor or measurement device adds complexity and potential for failure, in turn increasing costs for assembly and maintenance. Additionally, even more equipment is required for each variation of ice mold capable of being placed in the ice maker. Moreover still, current ice detection methods are insufficient in determining certain properties of ice formed within automatic ice makers.

Accordingly, a method of forming ice within an automatic ice maker that rectifies one or more of the above-mentioned drawbacks would be beneficial. In particular, a single apparatus capable of performing multiple measurements and determinations would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating an ice maker assembly is provided. The ice maker assembly may include an ice mold forming a plurality of pockets, and a camera. The method may include capturing, via the camera, an image of the ice mold; analyzing, by one or more computing devices using a machine learning image recognition model, the image to evaluate one or more characteristics of the ice mold; determining that at least one of the one or more characteristics requires a responsive action; and implementing the responsive action according to the determination of the one or more characteristics. The one or more characteristics may include at least one of an occupied volume within the ice mold, a type of ice maker installed, a presence of a cartridge within the ice maker, or a level of clarity of a formed ice cube within the ice mold.

In another exemplary aspect of the present disclosure, a refrigerator appliance is provided. The refrigerator appliance may include a cabinet defining a fresh food chamber and a freezing chamber; an ice maker assembly provided within the freezing chamber, the ice maker assembly comprising an ice mold defining a plurality of pockets; a camera provided within the ice maker assembly; and a controller operably coupled to the ice maker assembly, the controller being configured to perform a series of operations. The series of operations may include capturing, via the camera, an image of the ice mold; analyzing, by one or more computing devices using a machine learning image recognition model, the image to determine one or more characteristics of the ice mold; determining that at least one of the one or more characteristics requires a responsive action; and implementing the responsive action according to the determination of the one or more characteristics. The one or more characteristics may include at least one of an occupied volume within the ice mold, a type of ice maker installed, or a presence of a cartridge within the ice maker.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
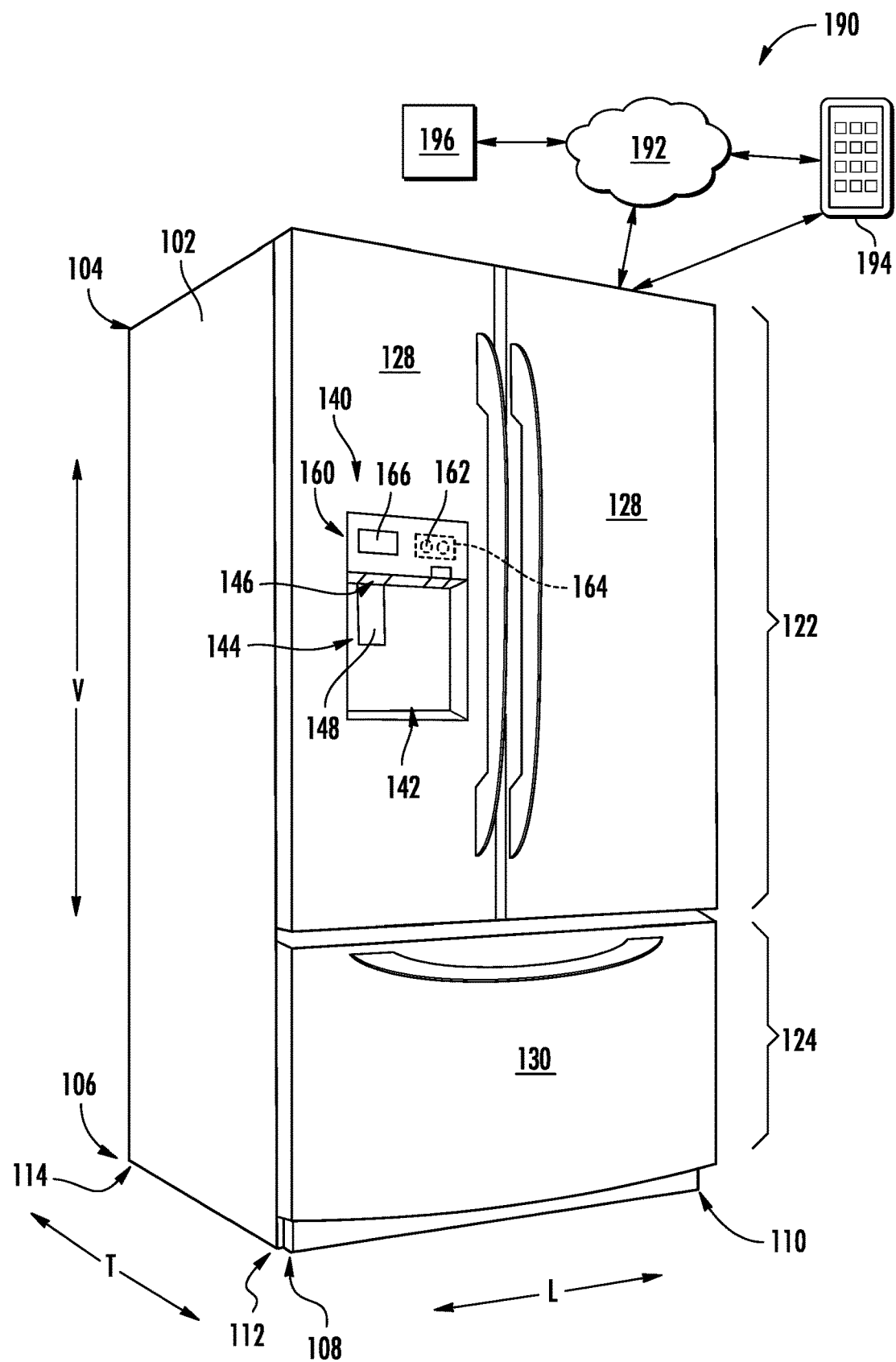
FIG. 1 provides a perspective view of a refrigerator appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a perspective view of a refrigerator appliance 100 according to an exemplary embodiment of the present subject matter. Refrigerator appliance 100 includes a cabinet 102 that extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another.

Cabinet 102 defines chilled chambers for receipt of food items for storage. In particular, cabinet 102 defines fresh food chamber 122 positioned at or adjacent top 104 of cabinet 102 and a freezer chamber 124 arranged at or adjacent bottom 106 of cabinet 102. As such, refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or a single door refrigerator appliance. Consequently, the description set forth herein is for illustrative purposes only and is not intended to be limiting in any aspect to any particular refrigerator chamber configuration.

Refrigerator doors 128 are rotatably hinged to an edge of cabinet 102 for selectively accessing fresh food chamber 122. In addition, a freezer door 130 is arranged below refrigerator doors 128 for selectively accessing freezer chamber 124. Freezer door 130 is coupled to a freezer drawer (not shown) slidably mounted within freezer chamber 124. Refrigerator doors 128 and freezer door 130 are shown in the closed configuration in FIG. 1. One skilled in the art will appreciate that other chamber and door configurations are possible and within the scope of the present invention.

Figure 2:
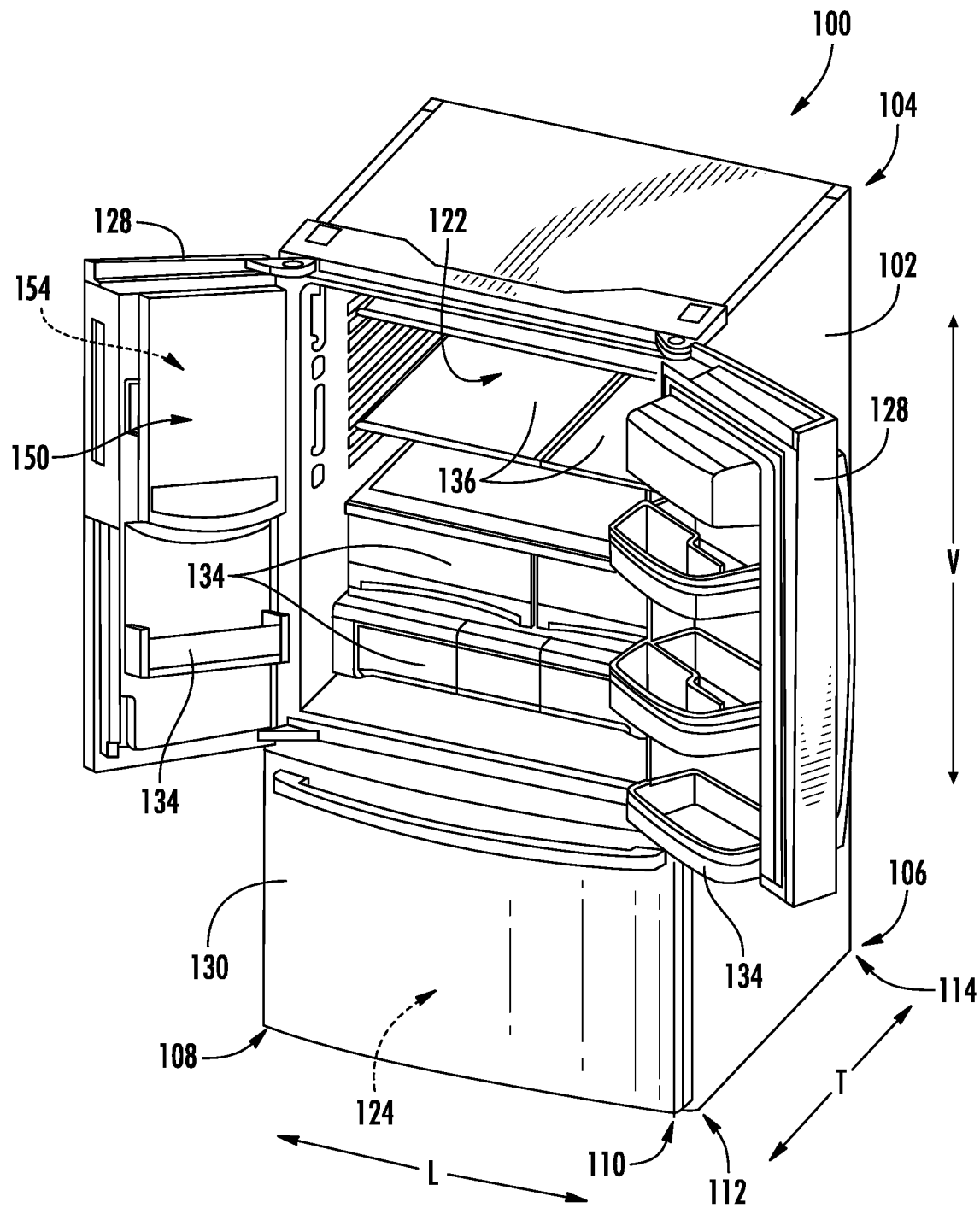
FIG. 2 provides a perspective view of the exemplary refrigerator appliance of FIG. 1, with the doors of the fresh food chamber shown in an open position.

FIG. 2 provides a perspective view of refrigerator appliance 100 shown with refrigerator doors 128 in the open position. As shown in FIG. 2, various storage components are mounted within fresh food chamber 122 to facilitate storage of food items therein as will be understood by those skilled in the art. In particular, the storage components may include bins 134 and shelves 136. Each of these storage components are configured for receipt of food items (e.g., beverages and/or solid food items) and may assist with organizing such food items. As illustrated, bins 134 may be mounted on refrigerator doors 128 or may slide into a receiving space in fresh food chamber 122. It should be appreciated that the illustrated storage components are used only for the purpose of explanation and that other storage components may be used and may have different sizes, shapes, and configurations.

Referring back generally to FIG. 1, a dispensing assembly 140 will be described according to exemplary embodiments of the present subject matter. Dispensing assembly 140 is generally configured for dispensing liquid water and/or ice. Although an exemplary dispensing assembly 140 is illustrated and described herein, it should be appreciated that variations and modifications may be made to dispensing assembly 140 while remaining within the present subject matter.

Dispensing assembly 140 and its various components may be positioned at least in part within a dispenser recess 142 defined on one of refrigerator doors 128. In this regard, dispenser recess 142 is defined on a front side 112 of refrigerator appliance 100 such that a user may operate dispensing assembly 140 without opening refrigerator door 128. In addition, dispenser recess 142 is positioned at a predetermined elevation convenient for a user to access ice and enabling the user to access ice without the need to bend-over. In the exemplary embodiment, dispenser recess 142 is positioned at a level that approximates the chest level of a user.

Dispensing assembly 140 includes an ice dispenser 144 including a discharging outlet 146 for discharging ice from dispensing assembly 140. An actuating mechanism 148, shown as a paddle, is mounted below discharging outlet 146 for operating ice or water dispenser 144. In alternative exemplary embodiments, any suitable actuating mechanism may be used to operate ice dispenser 144. For example, ice dispenser 144 can include a sensor (such as an ultrasonic sensor) or a button rather than the paddle. Discharging outlet 146 and actuating mechanism 148 are an external part of ice dispenser 144 and are mounted in dispenser recess 142.

By contrast, inside refrigerator appliance 100, refrigerator door 128 may define an icebox 150 (FIGS. 2 and 3) housing an icemaker and an ice storage bin 152 that are configured to supply ice to dispenser recess 142. In this regard, for example, icebox 150 may define an ice making chamber 154 for housing an ice making assembly, a storage mechanism, and a dispensing mechanism.

A control panel 160 is provided for controlling the mode of operation. For example, control panel 160 includes one or more selector inputs 162, such as knobs, buttons, touch-screen interfaces, etc., such as a water dispensing button and an ice-dispensing button, for selecting a desired mode of operation such as crushed or non-crushed ice. In addition, inputs 162 may be used to specify a fill volume or method of operating dispensing assembly 140. In this regard, inputs 162 may be in communication with a processing device or controller 164. Signals generated in controller 164 operate refrigerator appliance 100 and dispensing assembly 140 in response to selector inputs 162. Additionally, a display 166, such as an indicator light or a screen, may be provided on control panel 160. Display 166 may be in communication with controller 164 and may display information in response to signals from controller 164.

As used herein, "processing device" or "controller" may refer to one or more microprocessors or semiconductor devices and is not restricted necessarily to a single element. The processing device can be programmed to operate refrigerator appliance 100 and dispensing assembly 140. The processing device may include, or be associated with, one or more memory elements (e.g., non-transitory storage media). In some such embodiments, the memory elements include electrically erasable, programmable read only memory (EEPROM). Generally, the memory elements can store information accessible by the processing device, including instructions that can be executed by the processing device. Optionally, the instructions can be software or any set of instructions and/or data that when executed by the processing device, cause the processing device to perform operations.

Referring still to FIG. 1, a schematic diagram of an external communication system 190 will be described according to an exemplary embodiment of the present subject matter. In general, external communication system 190 is configured for permitting interaction, data transfer, and other communications with refrigerator appliance 100. For example, this communication may be used to provide and receive operating parameters, cycle settings, performance characteristics, user preferences, user notifications, or any other suitable information for improved performance of refrigerator appliance 100.

External communication system 190 permits controller 164 of refrigerator appliance 100 to communicate with external devices either directly or through a network 192. For example, a consumer may use a consumer device 194 to communicate directly with refrigerator appliance 100. For example, consumer devices 194 may be in direct or indirect communication with refrigerator appliance 100, e.g., directly through a local area network (LAN), Wi-Fi, Bluetooth, Zigbee, etc. or indirectly through network 192. In general, consumer device 194 may be any suitable device for providing and/or receiving communications or commands from a user. In this regard, consumer device 194 may include, for example, a personal phone, a tablet, a laptop computer, or another mobile device.

In addition, a remote server 196 may be in communication with refrigerator appliance 100 and/or consumer device 194 through network 192. In this regard, for example, remote server 196 may be a cloud-based server 196, and is thus located at a distant location, such as in a separate state, country, etc. In general, communication between the remote server 196 and the client devices may be carried via a network interface using any type of wireless connection, using a variety of communication protocols (e.g., TCP/IP, HTTP, SMTP, FTP), encodings or formats (e.g., HTML, XML), and/or protection schemes (e.g., VPN, secure HTTP, SSL).

In general, network 192 can be any type of communication network. For example, network 192 can include one or more of a wireless network, a wired network, a personal area network, a local area network, a wide area network, the internet, a cellular network, etc. According to an exemplary embodiment, consumer device 194 may communicate with a remote server 196 over network 192, such as the internet, to provide user inputs, transfer operating parameters or performance characteristics, receive user notifications or instructions, etc. In addition, consumer device 194 and remote server 196 may communicate with refrigerator appliance 100 to communicate similar information.

External communication system 190 is described herein according to an exemplary embodiment of the present subject matter. However, it should be appreciated that the exemplary functions and configurations of external communication system 190 provided herein are used only as examples to facilitate description of aspects of the present subject matter. System configurations may vary, other communication devices may be used to communicate directly or indirectly with one or more appliances, other communication protocols and steps may be implemented, etc. These variations and modifications are contemplated as within the scope of the present subject matter.

Figure 3:
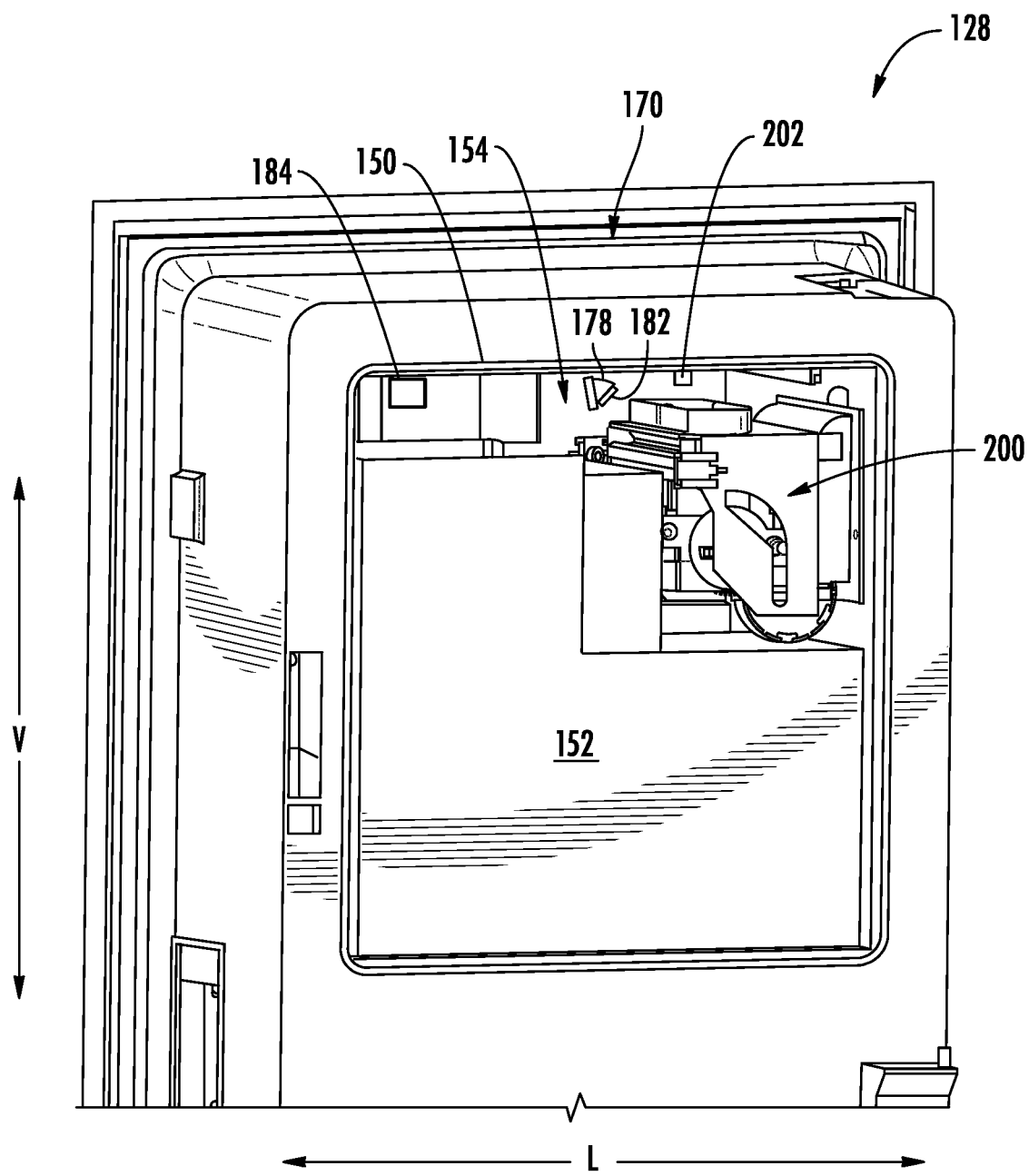
FIG. 3 provides a perspective view of an icebox and ice making assembly for use with the exemplary refrigerator appliance of FIG. 1 according to an exemplary embodiment of the present subject matter.
Figure 4:
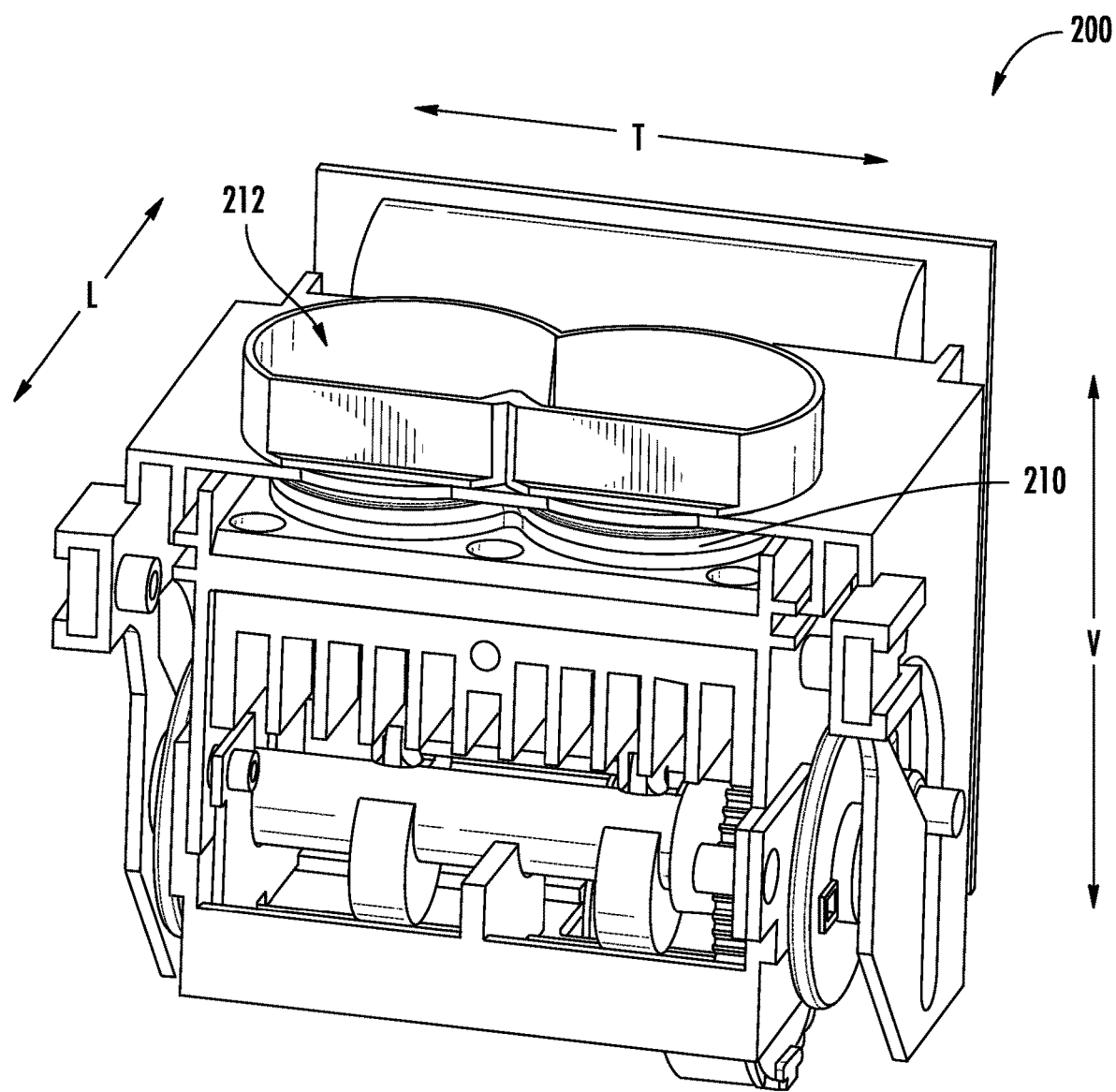
FIG. 4 provides a perspective view of the exemplary ice making assembly of FIG. 3 according to an exemplary embodiment of the present subject matter.

Referring now generally to FIGS. 3 and 4, an ice making assembly 200 that may be used with refrigerator appliance 100 will be briefly described according to exemplary embodiments of the present subject matter. As illustrated, ice making assembly 200 is mounted on icebox 150 within ice making chamber 154 and is configured for receiving a flow of water from a water supply spout 202 (see, e.g., FIG. 3). In this manner, ice making assembly 200 is generally configured for freezing the water to form ice cubes which may be stored in storage bin 152 and dispensed through discharging outlet 146 by dispensing assembly 140. However, it should be appreciated that ice making assembly 200 is described herein only for the purpose of explaining aspects of the present subject matter. Variations and modifications may be made to ice making assembly 200 while remaining within the scope of the present subject matter. For example, ice making assembly 200 could instead be positioned within freezer chamber 124 of refrigerator appliance 100 and may have any other suitable configuration. Moreover, it should be noted that the ice making assembly shown in FIG. 4 is merely an example, and that any suitable ice making assembly may be incorporated or used according to this disclosure. For example, the ice making assembly may include one or more interchangeable cartridges, one or more interchangeable molds (e.g., crescent molds, ball molds, nugget molds, etc.), or the like.

According to the illustrated embodiment, ice making assembly 200 includes a resilient mold 210 that defines a mold cavity 212. In general, resilient mold 210 is positioned below water supply spout 202 for receiving the gravity-assisted flow of water from water supply spout 202. Resilient mold 210 may be constructed from any suitably resilient material that may be deformed to release ice cubes after formation. For example, according to the illustrated embodiment, resilient mold 210 is formed from silicone or another suitable hydrophobic, food-grade, and resilient material.

According to the illustrated embodiment, resilient mold 210 defines two mold cavities 212, each being shaped and oriented for forming a separate ice cube. In this regard, for example, water supply spout 202 is configured for refilling resilient mold 210 to a level above a divider wall (not shown) within resilient mold 210 such that the water overflows into the two mold cavities 212 evenly. According to still other embodiments, water supply spout 202 could have a dedicated discharge nozzle positioned over each mold cavity 212. Furthermore, it should be appreciated that according to alternative embodiments, ice making assembly 200 may be scaled to form any suitable number of ice cubes, e.g., by increasing the number of mold cavities 212 defined by resilient mold 210.

Referring now specifically to FIG. 3, refrigerator appliance 100 may further include a camera assembly 170 that is generally positioned and configured for obtaining images of ice making chamber 154 of refrigerator appliance 100. According to the illustrated exemplary embodiment, camera assembly 170 includes a camera 178 that is mounted, for example, to an upper wall of ice making chamber 154. Specifically, camera 178 may be mounted such that is faces toward ice making assembly 200. In this manner, camera 178 can take images or video of an inside of ice making chamber 154 and/or ice making assembly 200 and remains unobstructed by ice cubes or any other protuberances or items that may obscure or distort such images.

It should be appreciated that camera assembly 170 may include any suitable number, type, size, and configuration of camera(s) 178 for obtaining images of ice making chamber 154. In general, camera 178 may include a lens 182 that is constructed from a clear hydrophobic and temperature resistant material or which may otherwise be positioned behind a clear lens. So positioned, camera assembly 170 may obtain one or more images or videos of ice or ice mold 210 within ice making chamber 154, as described in more detail below. Referring still to FIG. 3, refrigerator appliance 100 may further include a chamber light 184 that is positioned within ice making chamber 154 for selectively illuminating ice making chamber 154 and/or the ice making assembly 200 positioned therein. Additionally or alternatively, one or more heating elements may be provided within ice making chamber 154 (e.g., adjacent to camera assembly 170 and/or chamber light 184. The one or more heating elements may selectively provide heat to camera assembly 170 and/or chamber light 184 in order to prevent or mitigate fog accumulation.

Notably, controller 164 of refrigerator appliance 100 (or any other suitable dedicated controller) may be communicatively coupled to camera assembly 170, chamber light 184, ice making assembly 200, and other components of refrigerator appliance 100. As explained in more detail below, controller 164 may be programmed or configured for obtaining images using camera assembly 170, e.g., in order to detect certain operating conditions and improve the performance of refrigerator appliance 100, e.g., ice making assembly 200 and water supply spout 202.

As will be described further below, by including camera assembly 170, additional sensors and detection methods relating to ice making and storing may be omitted from refrigerator appliance 100. For instance, multiple temperature sensors typically included on ice molds (e.g., resilient mold 210) for determining when a freezing process is complete may be omitted, reducing costs. Additionally or alternatively, certain storage devices such as ice rakes and thermistors may be omitted. Accordingly, camera assembly 170 may be a multi-faceted instrument providing a plurality of useful traits, measurements, and calculations.

Figure 5:
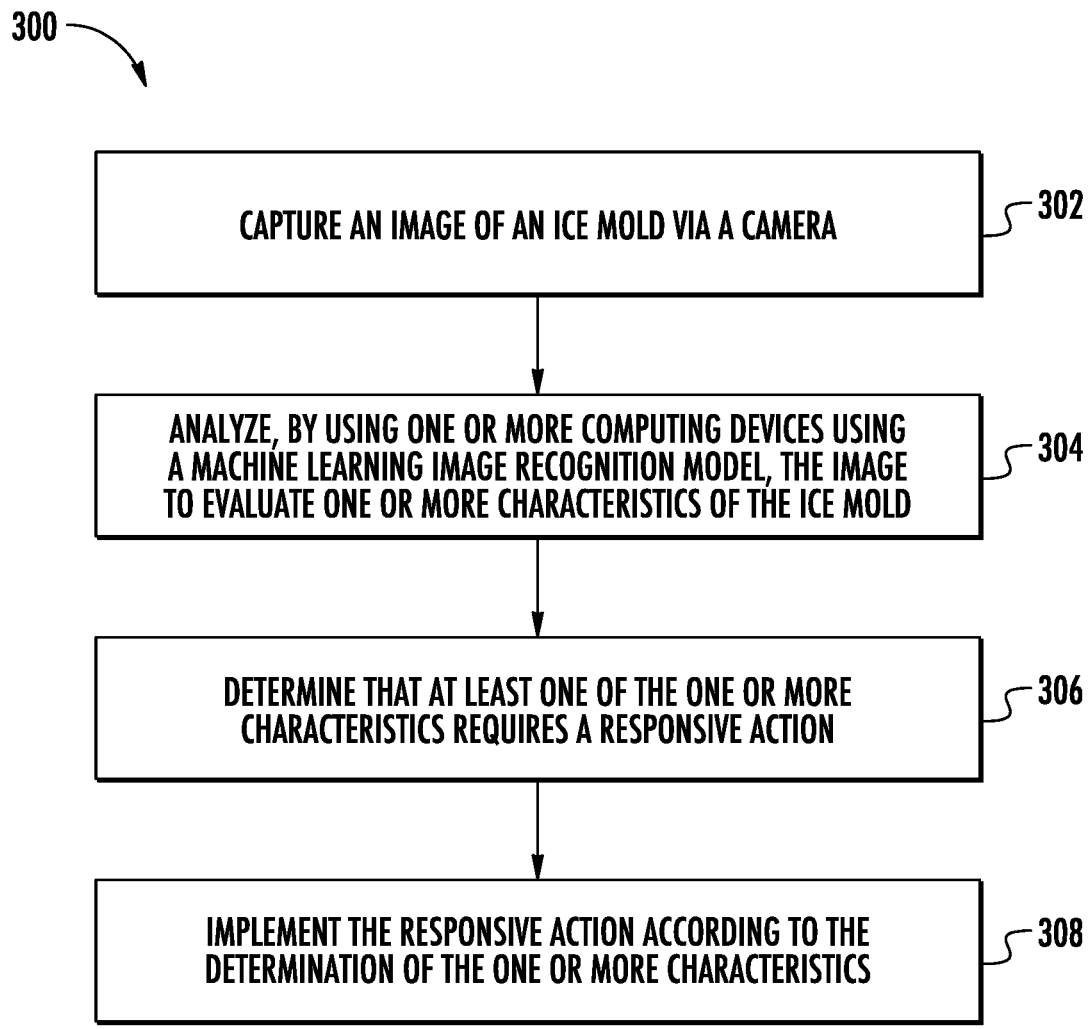
FIG. 5 provides a flow chart illustrating a method of operating a refrigerator appliance according to exemplary embodiments.

Referring now to FIG. 5, an exemplary method 300 of operating a refrigerating appliance will be described. Although the discussion below refers to the exemplary method 300 of operating refrigerator appliance 100, one skilled in the art will appreciate that the exemplary method 300 is applicable to the operation of a variety of other refrigerator or ice making appliances, such as stand along ice making appliances. In exemplary embodiments, the various method steps as disclosed herein may be performed by controller 164 or a separate, dedicated controller.

At step 302, method 300 may include capturing an image of an ice mold via a camera. In detail, a camera (e.g., camera 178) within an ice making chamber (e.g., ice making chamber 154) may capture one or more images of an ice mold (e.g., resilient mold 210 and/or ice making assembly 200). The camera may receive a trigger (e.g., from a controller such as controller 164) to capture the image. The trigger may be any suitable trigger or input command. For example, a request to initiate an ice making process can cause the controller to instruct the camera to capture the image. For other examples, the trigger may include a placement of an interchangeable ice mold in the ice making assembly, a time trigger (e.g., a predetermined amount of time after an initial harvest of ice from the ice making assembly), an operational trigger such as a temperature within the ice making chamber, or the like. Additionally or alternatively, the controller may instruct a chamber light (e.g., chamber light 184) to illuminate prior to capturing the image.

At step 304, method 300 may include analyzing, by using a controller (e.g., controller 164 which may include one or more computing devices) using a machine learning image recognition model, the image to evaluate one or more characteristics of the ice mold. It should be appreciated that any suitable image processing or recognition method may be used to analyze the images captured at step 302 and facilitate evaluation of the one or more characteristics. In addition, it should be appreciated that this image analysis or processing may be performed locally (e.g., by controller 164) or remotely (e.g., by a remote server).

According to exemplary embodiments of the present subject matter, step 304 of analyzing the one or more images may include analyzing the image(s) of the ice making chamber using a neural network classification module and/or a machine learning image recognition process. In this regard, for example, the controller may be programmed to implement the machine learning image recognition process that includes a neural network trained with a plurality of images of an ice making assembly including various ice molds, images of both liquid water and frozen ice within pockets of each ice mold, etc. By analyzing the image(s) captured using this machine learning image recognition process, the controller may properly evaluate the one or more characteristics of the ice mold or ice making assembly, e.g., by identifying the trained image that is closest to the obtained image.

As used herein, the terms image recognition process and similar terms may be used generally to refer to any suitable method of observation, analysis, image decomposition, feature extraction, image classification, etc. of one or more images or videos taken within a refrigerator appliance. In this regard, the image recognition process may use any suitable artificial intelligence (AI) technique, for example, any suitable machine learning technique, or for example, any suitable deep learning technique. It should be appreciated that any suitable image recognition software or process may be used to analyze images taken by the camera and the controller may be programmed to perform such processes and take corrective action.

According to an exemplary embodiment, controller may implement a form of image recognition called region based convolutional neural network ("R-CNN") image recognition. Generally speaking, R-CNN may include taking an input image and extracting region proposals that include a potential object, such as a particular region containing an icemaker, an ice mold, or the like. In this regard, a "region proposal" may be regions in an image that could belong to a particular object, such as a particular shape of an ice mold, pocket, or cartridge. A convolutional neural network may then be used to compute features from the regions proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information—image segmentation may involve dividing an image into segments (e.g., into groups of pixels containing similar attributes) that may be analyzed independently or in parallel to obtain a more detailed representation of the object or objects in an image. This may be referred to herein as "Mask R-CNN" and the like.

According to still other embodiments, the image recognition process may use any other suitable neural network process. For example, step 304 may include using Mask R-CNN instead of a regular R-CNN architecture. In this regard, Mask R-CNN is based on Fast R-CNN which is slightly different than R-CNN. For example, R-CNN first applies CNN and then allocates it to zone recommendations on the covn5 property map instead of the initially split into zone recommendations. In addition, according to exemplary embodiments standard CNN may be used to analyze the image to determine various attributes or characteristics of the ice mold. In addition, a K-means algorithm may be used. Other image recognition processes are possible and within the scope of the present subject matter.

It should be appreciated that any other suitable image recognition process may be used while remaining within the scope of the present subject matter. For example, step 304 may include using a deep belief network ("DBN") image recognition process. A DBN image recognition process may generally include stacking many individual unsupervised networks that use each network's hidden layer as the input for the next layer. According to still other embodiments, step 304 may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence ("AI") analysis techniques, and combinations of the above described or other known methods may be used while remaining within the scope of the present subject matter.

At step 306, method 300 may include determining that at least one of the one or more characteristics requires a responsive action. In detail, upon analyzing the one or more captured images, the controller may determine that a specific action is required. For one example, the captured image is an image of the plurality of pockets of the ice mold. According to this example, the image is captured before a fill program or process has been completed (e.g., the pockets are void of liquid). The controller, using the image processing neural network model, may determine a size, shape, and/or style of each of the plurality of pockets. From this, the controller may determine an appropriate volume of liquid (e.g., water) required to be added to the pockets to form ice cubes. Advantageously, an auto-fill system may avoid under-filling or over-filling the pockets, reducing the chance for flooding.

According to another example. the camera may capture an image of the ice mold after performing a first harvesting operation (e.g., releasing the formed ice cubes from the ice mold). The controller may, after analyzing the captured image, determine that one or more formed ice cubes are still present within the ice mold. The controller may then perform an additional or second harvesting operation to ensure that all formed ice cubes have been released from the ice mold. Thus, excessive overfills and potential jamming of the ice making assembly may be avoided.

As another example, the camera may capture a first image of the pockets after they have been supplied with the liquid. The controller may calculate an approximate volume of liquid within the pockets immediately after the fill (e.g., while still in the liquid state). The camera may then capture additional images, for example, at predetermined time intervals. With each additional image captured, the controller may compare the most recently captured image with the first image. In detail, the controller may approximate an occupied volume within the pockets at each additional image. The controller may then compare the calculated occupied volume at each additional image with the calculated occupied volume of the first image. The controller may thus calculate a volumetric expansion of the occupied volume of the pockets (e.g., the volume occupied by water in a liquid state versus the volume occupied by water in the frozen state, or ice).

As yet another example, the ice making assembly installed within the ice making chamber may be a cartridge ice maker, utilizing replaceable cartridges that may contain water to be frozen. The camera may capture an overall image of the ice making assembly and analyze a position of the cartridge, e.g., after the cartridge is inserted or placed by a user. By comparing the captured image of the cartridge location with a plurality of stored images of the same cartridge, the controller may determine whether the cartridge is properly installed within the ice making assembly. It should be understood that the one or more characteristics are not limited to the examples given above, and that any suitable characteristic may be evaluated. For instance, the one or more characteristics may include a level of clarity of the formed ice cubes, a size of the ice cubes, a shape of the ice cubes, or the like.

For instance, the camera may capture an image of a formed ice cube. The controller may compare the captured image against a library of ice cubes and determine a clarity level of the formed ice cube. In this instance, the clarity level may refer to a cloudiness or opaqueness of the formed ice cube. Moreover, the ice making assembly may include a fan that supplies cool air to the ice mold. If a user desires clear ice and the formed ice cube is determined to be overly cloudy, the controller may adjust a speed of the fan. For instance, a lower speed setting on the fan may increase a freezing time, resulting in a clearer ice cube. Conversely, if a cloudy ice cube is desired and the formed ice cube is determined to be overly clear, the controller may increase the speed of the fan to reduce the freezing time, resulting in cloudier ice cubes.

At step 308, method 300 may include implementing the responsive action according to the determination of the one or more characteristics. In detail, referring to the first example above, after capturing and analyzing the image of the empty pockets of the ice mold, the controller may determine that the responsive action required is a particular fill algorithm. For instance, the particular fill algorithm may be directed toward an amount of water to be supplied to the pockets, an appropriate water pressure required to avoid splashing within the ice making chamber, a direction or location of water to be supplied (e.g., when water supply spout 202 is adjustable or moveable), or the like. Thus, the controller may instruct the auto-fill system to supply the required water by running the appropriate fill algorithm.

As another example, when the characteristic is the volumetric expansion within the pockets, as described above, the controller may compare the calculated occupied volume within each pocket after an initial fill with the calculated occupied volume within each pocket after a predetermined time. When the difference between the occupied volumes reaches a certain predetermined amount or level, the controller may implement the responsive action. According to this example, the responsive action may be harvesting the ice from the ice mold. For instance, when the ice making assembly is an automatic ice making assembly, the controller may initiate a harvesting procedure, e.g., stored within a memory of the refrigerator appliance. Additionally or alternatively, the controller may alert the user that the ice making process has completed. The alert may be delivered or instituted through the appliance or through a mobile device registered to the user (e.g., consumer device 194).

As yet another example, when the characteristic is the positioning of the cartridge within the ice making assembly, the controller may determine that the responsive action includes notifying or alerting the user as to the installation state of the cartridge. For instance, upon determining that the cartridge is misplaced within the ice making chamber, the controller may instruct the refrigerator appliance to alert the user. As described above with respect to the second example, the alert may be delivered or instituted through the appliance or through the mobile device registered to the user. Additionally or alternatively, the controller may determine that the cartridge is correctly placed within the ice making assembly. Accordingly, the responsive action may include initiating a fill process to supply liquid to the cartridge. It should be noted that the disclosure is not limited to the examples described above, and that any suitable responsive actions may be determined and implemented. For instance, the camera may capture images of an ice storage bucket (e.g., icebox 150), the controller may determine a freezing rate, the controller may determine a particular cloudiness or softness of ice cubes, etc.

FIG. 5 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using refrigerator appliance 100 as an example, it should be appreciated that this method may be applied to the operation of any suitable refrigerator or freezer appliance, such as a stand-alone ice making appliance.

According to the above description of the present disclosure, a camera may be provided within an ice making chamber of a refrigerator appliance. The camera may be configured to capture images of the ice making chamber, an ice making assembly, an ice mold, an ice storage bucket, or the like, including any combination of the above. The camera may transmit the captured images to a controller to be processed using an image processing neural network model. The resulting analysis may evaluate one or more characteristics of the ice maker assembly and/or ice mold, for example. The image detection and recognition model may determine that a state of one or more of the evaluated characteristics requires a responsive action to be taken. Upon determining that a responsive action is warranted, the controller may institute the proper responsive action. For instance, the controller may determine that a harvesting process is required, that a particular fill procedure is required, that a particular ice mold is in place (or not in place), or the like. Accordingly, and advantageously, additional sensors and methods for making determinations relating to ice making may be omitted from the refrigerator appliance, reducing maintenance costs and operating costs while reducing the potential for sensor failure or the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an ice maker assembly, the ice maker assembly comprising an ice mold forming a plurality of pockets and a camera, the method comprising:
   capturing, via the camera, an image of the ice mold;
   analyzing, by a controller using a machine learning image recognition model, the image to evaluate one or more characteristics of the ice mold;
   determining that at least one of the one or more characteristics requires a responsive action; and
   implementing the responsive action according to the determination of the one or more characteristics, wherein the one or more characteristics comprise at least one of an occupied volume within the ice mold, a type of ice maker installed, a presence of a cartridge within the ice maker, or a level of clarity of a formed ice cube within the ice mold, and wherein determining that the at least one of the one or more characteristics requires the responsive action comprising determining a position of the cartridge within the ice maker when the one or more characteristics comprises the presence of the cartridge within the ice maker.

2. The method of claim 1, wherein the machine learning image recognition model comprises at least one of a convolution neural network ("CNN"), a region-based convolution neural network ("R-CNN"), a deep belief network ("DBN"), or a deep neural network ("DNN") image recognition process.

3. The method of claim 1, wherein determining that the at least one of the one or more characteristics comprises determining that the plurality of pockets contain ice when the one or more characteristics comprises the occupied volume within the ice mold, the method further comprising:
capturing, via the camera, a first image of the ice mold;
determining a first occupied volume within the plurality of pockets of the ice mold;
capturing, via the camera, a second image of the ice mold after a predetermined amount of time;
determining a second occupied volume within the plurality of pockets of the ice mold;
comparing the first occupied volume with the second occupied volume to calculate a volumetric expansion within the plurality of pockets of the ice mold; and
determining that the occupied volume within the plurality of pockets of the ice mold is ice via the calculated volumetric expansion.

4. The method of claim 3, wherein the responsive action comprises performing a first harvesting operation to harvest the ice from the plurality of pockets of the ice mold.

5. The method of claim 4, further comprising:
capturing, via the camera, a third image of the ice mold after harvesting the ice from the plurality of pockets of the ice mold;
determining that at least one of the plurality of pockets is occupied after the harvesting; and
performing a second harvesting operation.

6. The method of claim 1, wherein determining that the at least one of the one or more characteristics comprises determining the type of ice mold installed when the one or more characteristics comprises the type of ice maker, the method further comprising:
determining a shape of each of the plurality of pockets of the ice mold in response to analyzing the image;
determining that each of the plurality of pockets is empty in response to determining the shape of each of the plurality of pockets; and
implementing the responsive action in response to determining that each of the plurality of pockets is empty.

7. The method of claim 6, wherein the responsive action comprises initiating a corresponding fill program according to the determined shape of each of the plurality of pockets.

8. The method of claim 1, further comprising:
determining that the cartridge is properly installed within the ice maker; and
implementing the responsive action in response to determining that the cartridge is properly installed, the responsive action comprising initiating a corresponding fill program to provide liquid to the cartridge.

9. The method of claim 1, further comprising:
determining that the cartridge is not properly installed within the ice maker; and
implementing the responsive action in response to determining that the cartridge is not properly installed, the responsive action comprising alerting a user to adjust a position of the cartridge.

10. A refrigerator appliance, comprising:
a cabinet defining a fresh food chamber and a freezing chamber;
an ice maker assembly provided within the freezing chamber, the ice maker assembly comprising an ice mold defining a plurality of pockets;
a camera provided within the ice maker assembly; and
a controller operably coupled to the ice maker assembly, the controller being configured to perform a series of operations, the series of operations comprising:
capturing, via the camera, an image of the ice mold;
analyzing, by a controller using a machine learning image recognition model, the image to determine one or more characteristics of the ice mold;
determining that at least one of the one or more characteristics requires a responsive action; and
implementing the responsive action according to the determination of the one or more characteristics, wherein the one or more characteristics comprise at least one of an occupied volume within the ice mold, a type of ice maker installed, or a presence of a cartridge within the ice maker, and wherein determining that the at least one of the one or more characteristics requires the responsive action comprising determining a position of the cartridge within the ice maker when the one or more characteristics comprises the presence of the cartridge within the ice maker.

11. The refrigerator appliance of claim 10, wherein the machine learning image recognition model comprises at least one of a convolution neural network ("CNN"), a region-based convolution neural network ("R-CNN"), a deep belief network ("DBN"), or a deep neural network ("DNN") image recognition process.

12. The refrigerator appliance of claim 10, wherein determining that the at least one of the one or more characteristics comprises determining that the plurality of pockets contain ice when the one or more characteristics comprises the occupied volume within the ice mold, the series of operations further comprising:
capturing, via the camera, a first image of the ice mold;
determining a first occupied volume within the plurality of pockets of the ice mold;
capturing, via the camera, a second image of the ice mold after a predetermined amount of time;
determining a second occupied volume within the plurality of pockets of the ice mold;
comparing the first occupied volume with the second occupied volume to calculate a volumetric expansion within the plurality of pockets of the ice mold; and
determining that the occupied volume within the plurality of pockets of the ice mold is ice via the calculated volumetric expansion.

13. The refrigerator appliance of claim 12, wherein the responsive action comprises harvesting the ice from the plurality of pockets of the ice mold.

14. The refrigerator appliance of claim 10, wherein determining that the at least one of the one or more characteristics comprises determining the type of ice mold installed when the one or more characteristics comprises the type of ice maker, the series of operations further comprising:
determining a shape of each of the plurality of pockets of the ice mold in response to analyzing the image;
determining that each of the plurality of pockets is empty in response to determining the shape of each of the plurality of pockets; and
implementing the responsive action in response to determining that each of the plurality of pockets is empty.

15. The refrigerator appliance of claim 14, wherein the responsive action comprises initiating a corresponding fill program according to the determined shape of each of the plurality of pockets.

16. The refrigerator appliance of claim 15, wherein the type of ice maker is one of a twist ice maker, a crescent ice maker, a nugget ice maker, a clear ice maker, or a cartridge ice maker.

17. The refrigerator appliance of claim 10, wherein the series of operations further comprises:
- determining that the cartridge is properly installed within the ice maker; and
- implementing the responsive action in response to determining that the cartridge is properly installed, the responsive action comprising initiating a corresponding fill program to provide liquid to the cartridge.

18. The refrigerator appliance of claim 10, wherein the series of operations further comprises:
- determining that the cartridge is not properly installed within the ice maker; and
- implementing the responsive action in response to determining that the cartridge is not properly installed, the responsive action comprising alerting a user to adjust a position of the cartridge.

* * * * *